United States Patent
El-Gawady et al.

(10) Patent No.: US 10,027,798 B2
(45) Date of Patent: Jul. 17, 2018

(54) CONNECTION OF A USER DEVICE TO MULTIPLE ACCOUNTS OR PHONE NUMBERS

(71) Applicant: Verizon Patent and Licensing Inc., Arlington, VA (US)

(72) Inventors: Sameh El-Gawady, Waltha, MA (US); Vered Ben-Anat, Cambridge, MA (US); Jason A. Coglon, Morristown, NJ (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 182 days.

(21) Appl. No.: 15/099,924

(22) Filed: Apr. 15, 2016

(65) Prior Publication Data
US 2017/0302789 A1    Oct. 19, 2017

(51) Int. Cl.
   H04M 1/57    (2006.01)
   H04M 3/42    (2006.01)
   H04L 29/06    (2006.01)

(52) U.S. Cl.
   CPC .... H04M 3/42042 (2013.01); H04L 65/1006 (2013.01); H04M 3/42153 (2013.01)

(58) Field of Classification Search
   CPC ................ H04L 65/1016; H04L 65/1006
   See application file for complete search history.

(56) References Cited

U.S. PATENT DOCUMENTS

2008/0186929 A1* 8/2008 Rice ............... H04L 65/104
                                                    370/338
2012/0282915 A1* 11/2012 Haynes ........... H04W 68/12
                                                    455/422.1

* cited by examiner

*Primary Examiner* — Joshua Schwartz

(57) ABSTRACT

Multiple mobile device numbers (MDNs) may be associated with a single user device. For outgoing communications, the user may choose which of the accounts are to be used. For incoming communications, application layer processes may perform an arbitration function to ensure that that the communication state, associated with each MDN, is correctly updated both at the user device and in the telecommunications network.

20 Claims, 11 Drawing Sheets

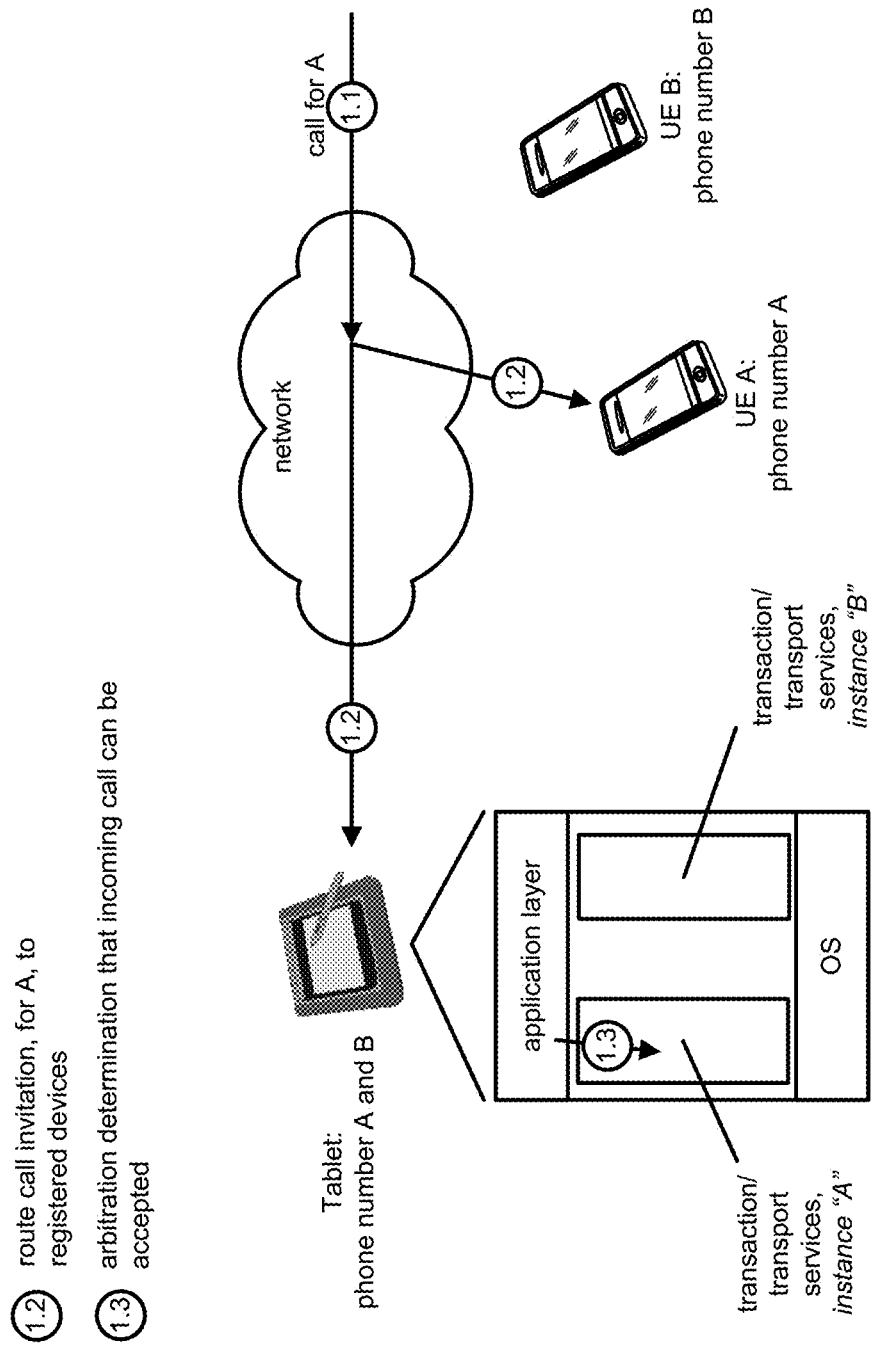

US 10,027,798 B2

CONNECTION OF A USER DEVICE TO MULTIPLE ACCOUNTS OR PHONE NUMBERS

BACKGROUND

Mobile phones, such as smartphones, are normally assigned a phone number through which users can make and receive telephone calls using a wireless cellular network. Some cellular network operators allow other network-connected user devices, such as tablets, televisions, wearable devices (e.g., smart watches), etc., to be associated, as secondary devices, with the phone number or account of a primary mobile device (e.g., the user's smartphone). Telephone calls made to the phone number may then be received, and potentially answered, at either the primary and secondary devices.

BRIEF DESCRIPTION OF THE DRAWINGS

FIGS. 1A and 1B are diagram illustrating an example overview of one or more implementations described herein;

DETAILED DESCRIPTION OF PREFERRED EMBODIMENTS

The following detailed description refers to the accompanying drawings. The same reference numbers in different drawings may identify the same or similar elements.

Implementations described herein may allow for the association of multiple user accounts (e.g., based on the mobile device number (MDN)) with a single secondary device. For outgoing communications, the user may choose which of the accounts are to be used. For incoming and outgoing communications, application layer processes may perform an arbitration function to ensure that that the communication state, associated with each account, is correctly updated both at the secondary device and in the telecommunications network.

Session Initiation Protocol (SIP) signaling may be used to implement control plane signaling for the communications associated with the primary and secondary devices. In one implementation, the SIP transaction and transport software layer, at the secondary devices, may be implemented such that different MDNs, associated with the secondary device, may result in execution of a separate instance of the SIP transaction/transport software. Arbitration decisions relating to the communication state of the secondary device may be communicated, by the application process, to the SIP transaction/transport instances. In this manner, multiple MDNs may be associated with a single secondary device.

Figure 1B:
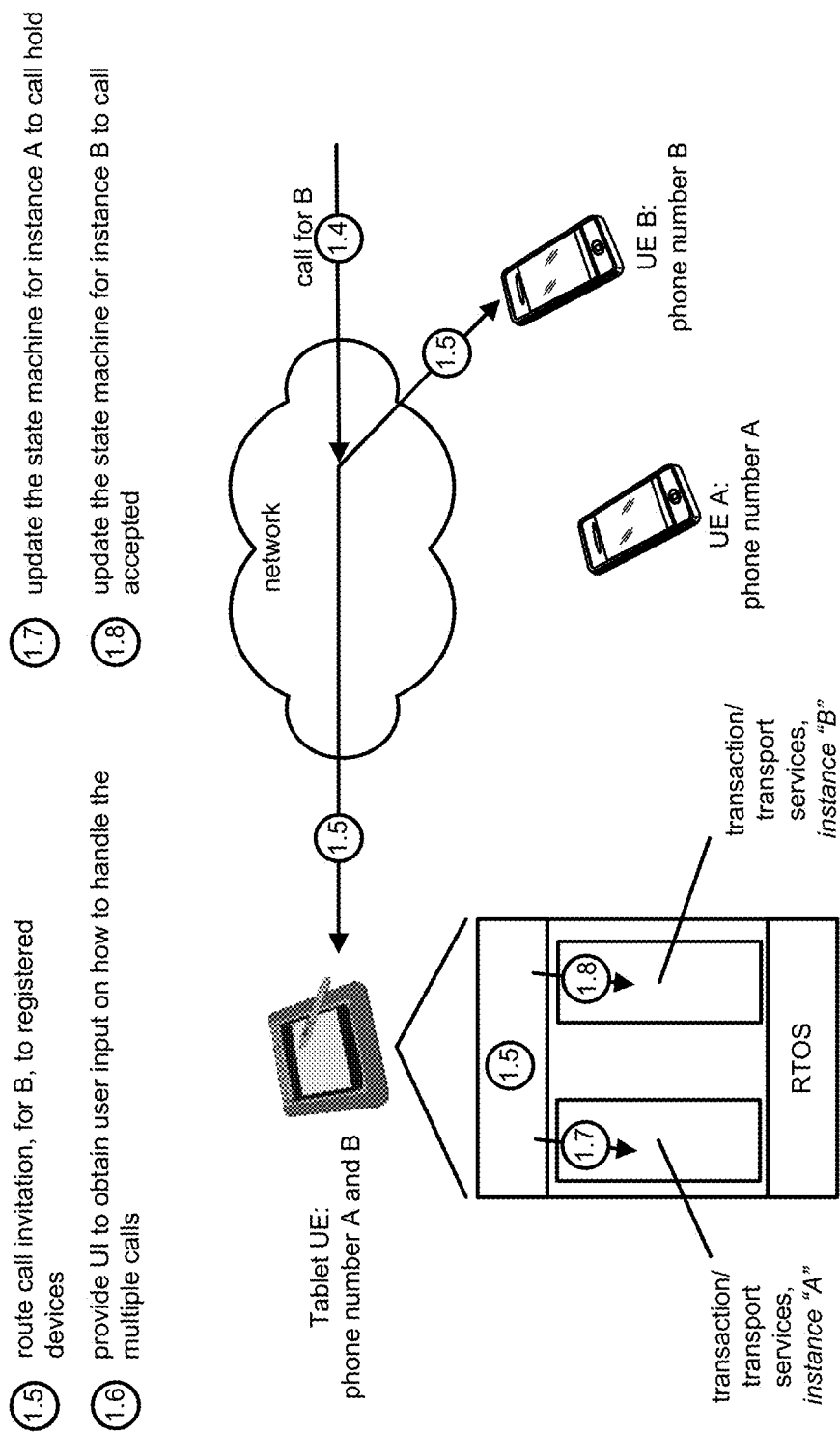

FIGS. 1A and 1B are diagrams illustrating an example overview of one or more implementations described herein. As shown, User Equipment (UE) may connect to a network. The UEs may generally include any type of communication device that can communicate via the network. As is particularly shown in FIG. 1A, two of the UEs, "UE A" and "UE B," may be mobile telephones, such as smartphones. The network may include a wireless cellular communications network and UE A and UE B may connect, to the network, via a wireless (e.g., radio) interface. UE A and UE B may each be the primary device, associated with a user account, through which users connect to the network. In this example, assume that UE A is assigned phone number (MDN) "A" and UE B is assigned MDN "B". Another device, which may correspond to a tablet device "tablet UE," is also illustrated in FIG. 1A. The tablet may be a network-connected device, such as one that connects through a broadband connection to a packet-based network (e.g., the Internet). Alternatively or additionally, the tablet may also include a radio interface to the wireless cellular network. The tablet may be a secondary device is not associated with a permanent MDN in the wireless cellular network.

The user of the tablet may wish to receive communications (e.g., telephone calls, video calls, or other media communications) that are directed to MDN A or MDN B. For example, assume that the user of the tablet is using the tablet while at home and would like to receive communications that are directed to either UE A (e.g., the user's phone number) or UE B (e.g., the phone number of the user's spouse). The user may register the tablet, with the network, to associate the tablet with both A and B.

At some point, a media session, such as a Voice over Long Term Evolution (VoLTE) communication, (e.g., a telephone call, video call, text, or video message, etc.) may be initiated to MDN A (at 1.1, "call for A"). In this example, the media session is illustrated as a telephone call. The network may route a call invitation to both UE A and the tablet (at 1.2, "route call invitation, for A, to registered devices"). That is, if both UE A and the tablet are connected to the network, both UE A and the tablet may receive an indication of an incoming communication. For example, the user interfaces of UE A and the tablet may present a "ringing" interface to the user. When the telephone call is answered at either UE A or the tablet, the ringing may be canceled at the device for which the telephone call was not answered.

As is further shown in FIG. 1A, the software of the tablet may include a software stack (i.e., a layering of different software components) that includes an application layer, a transaction/transport services layer, and an operating system (OS). The application layer may provide high-level functionality relating to different applications, performed by the tablet, including user interface functionality. The application layer may communicate with the transaction/transport services layer. The OS may implement the basic operating system software of the tablet. The transaction/transport services layer may store state information relating to the communication state of MDNs A and B and, based on the state, perform control plane signaling functions relating to control of the media sessions. The tablet UE may maintain a separate instance, for each MDN, of the transaction/transport services software. Thus, as shown in FIG. 1A, the tablet includes "transaction/transport services instance A"

and "transaction/transport services instance B." The two instances may be implemented independently of one another. Arbitration decisions relating to the simultaneous use of both MDN A and B (e.g., arbitration of conflicts in the simultaneous use of two MDNs) may be made by the application layer. By implementing multiple instances of the transaction/transport services layer, with arbitration by the application layer, multiple MDNs can be associated with a secondary device (e.g., the tablet).

In response to the communication invitation, the application layer may forward, to the appropriate transaction/transport service instance, updated state information. As is particularly shown in FIG. 1A, the application layer may determine that, because both MDN A and MDN B are not currently involved in a call, that the state of the line for A can be changed to "incoming call" (at 1.3, "arbitration determination that incoming call can be accepted"). If the user answers the call, the state may be changed to "callee pickup" or "call active."

Referring to FIG. 1B, assume that a second call request, for MDN B is received (at 1.4, "call for B"). The network may route a call invitation to both UE B and the tablet (at 1.5, "route call invitation, for B, to registered devices"). At the tablet, as part of the call arbitration process, the tablet may determine that, because a call is currently in progress with another phone number (MDN A), user input may be needed to determine how to handle the multiple calls. The tablet may provide a user interface (UI) to obtain input, from the user relating to how to handle the calls (at 1.6, "provide UI to obtain user input on how to handle multiple calls"). In this example, assume that the user indicates that the call for MDN A should be put on hold and the call for MDN B should be accepted. The application layer software may correspondingly signal the transaction/transport services for A that that call should be placed on hold (at 1.7, "update the state machine for instance A to call hold"). Similarly, the application layer software may correspondingly signal the transaction/transport services for B that the call should be accepted (at 1.8, "update the state machine for instance A to call accepted").

Consistent with aspects described herein, multiple MDNs can be assigned to a single device. The software stack for the device may be expanded to handle multiple, simultaneous transaction/transport services entities. The application layer of the device may be enhanced to offer users a choice in the arbitration of conflicts with the MDNs and to offer users a selection choice when establishing outgoing media sessions. The concepts described herein may be particularly beneficial to users that have multiple secondary endpoints (e.g., tablet computers, personal computers, smart watches) and in situations in which one user would like to provide at-will network connectivity to another user (e.g., a parent enabling the tablet, of a child, to receive calls).

Figure 2:
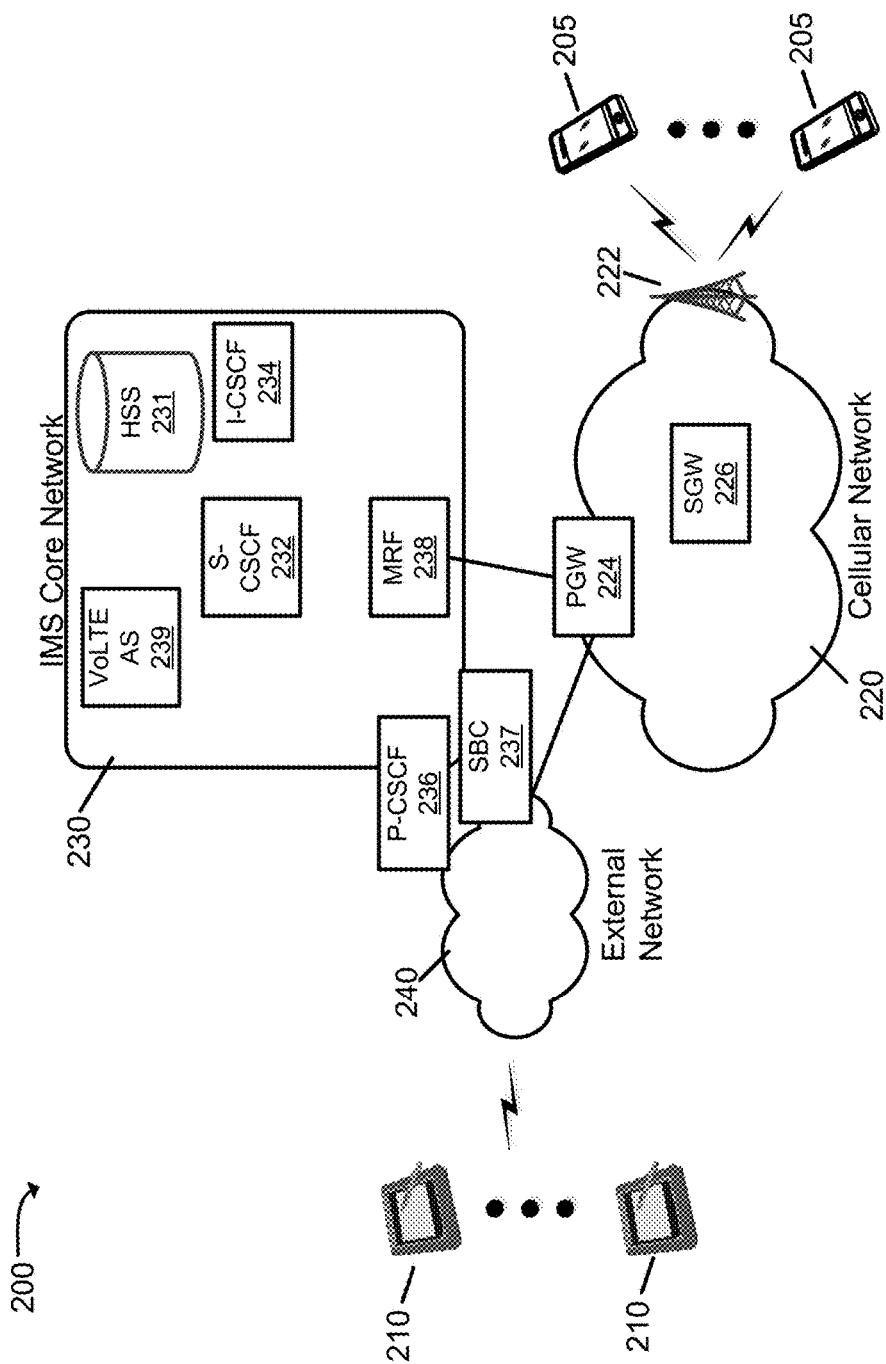
FIGS. 2 and 3 are diagrams illustrating an example environment in which systems and/or methods described herein may be implemented.

FIG. 2 illustrates an example environment 200, in which systems and/or methods described herein may be implemented. As shown in FIG. 2, environment 200 may include UEs 205, user devices 210, wireless cellular network 220, Internet Protocol (IP) Multimedia Subsystem (IMS) core network 230, and external network 240. UEs 205 may include mobile devices that have accounts, and corresponding unique MDNs associated with wireless cellular network 220. In the discussion with respect to FIGS. 1A and 1B, UEs 205 may correspond to the primary devices and user devices 210 the secondary devices.

UEs 205 may include any computation and communication device that is capable of communicating with one or more networks (e.g., cellular network 220). For example, UE 205 may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a set-top device ("STD"), a personal gaming system, a wearable device, and/or another type of computation and communication device. UEs 205 may each be associated with a MDN.

User devices 210, similar to UEs 205, may include a computation and communication device that is capable of communicating with one or more networks (e.g., the external network 240). Unlike UEs 205, however, user devices 210 may not necessarily be associated with MDNs. For example, a user device 210 may include a tablet computing device through which a user may connect, via a WiFi connection and/or using a wired Internet Service Provider (ISP), to an external network such as the Internet. Via the external network, user devices 210 may be capable of using communication services, such as voice and data VoLTE services, that are provided through IMS core 230. Users of user devices 210 may install client software to enable the VoLTE services and/or the necessary software may be installed during manufacturing or provisioning of user devices 210.

Cellular network 220 may provide wireless network service to one or more UEs 205. Cellular network 220 may include, for example, a network based on the Long Term Evolution (LTE) standard and may include a radio access network (RAN) portion and a core portion. The RAN may provide the wireless (e.g., radio) interface to UEs 205 and may include one or more base stations, which, in the context of an LTE network, may be referred to as Evolved Node Bs (eNBs). Cellular network 220 may use VoLTE to handle voice calls and/or to provide other services. VoLTE may be based on the IMS network standard, and may be provided by IMS core network 230. In general, IMS refers to an architecture designed to provide mobile and fixed multimedia services. IMS may use a standardized implementation of Session Initiation Protocol (SIP) and may run over IP networks.

As is particularly shown in FIG. 2, cellular network 220 may include eNB 222, Packet Data Network Gateway (PGW) 224, and Serving Gateway (SGW) 226. eNB 222 may include one or more network devices that receives, processes, and/or transmit traffic destined for and/or received from user device 210 (e.g., via an air interface). eNB 222 may function to provide an air (radio) interface for UEs 205. Multiple eNBs 222 may operate together to provide network coverage over a large geographical area. PGW 224 may receive traffic from the external network and may send the traffic toward UE 205 (via eNB 205). SGW 226 may aggregate traffic received from one or more eNBs 222 and may send the aggregated traffic to another network or device via PGW 224. SGW 226 may operate as an anchor for the user plane during inter-eNB handovers and as an anchor for mobility between different telecommunication networks.

IMS core network 230 may provide for the delivery of IP multimedia services, referred to broadly as "media sessions" herein, to UEs 205 and user devices 210. IMS core network 230 may use SIP as the control plane signaling mechanism for the media sessions over various connected networks (e.g., cellular network 220 and external network 240).

IMS core network 230 may include a Home Subscriber Server (HSS) 231. HSS 231 may include a computing device that maintains a database to support the IMS network devices. HSS 231 may maintain subscription-related information (subscriber profiles), perform authentication and authorization of the user, and may provide information about the subscriber's location and IP information.

IMS core network 230 may further include a number of Call Session Control Function (CSCF) components. The CSCF components are used to process the IMS SIP signaling packets. The CSCF components may include Serving-CSCF (S-CSCF) 232, Interrogating-CSCF (I-CSCF) 234, and Proxy-CSCF (P-CSCF) 236. S-CSCF 232 may be a SIP server that functions as a central node in the signaling plane. S-CSCF 232 may receive subscribe profile information from HSS 231, may handle SIP registrations, and may make forwarding decisions relating to the forwarding of SIP messages to application servers. I-CSCF 234 may be a SIP server that queries HSS 231 to retrieve S-CSCF 232 addresses and assign a particular S-CSCF 232 to a particular user during registration. I-CSCF 234 may also forward SIP requests or responses to the appropriate S-CSCF 232. P-CSCF 236 may be a SIP server that acts as a first point of contact, in the IMS core, for an IMS device (e.g., UE 205 or user device will 210). P-CSCF 236 may provide for subscriber authentication and authorization functions and may generate charging records.

IMS core network 230 may further include one or more application servers to facilitate the offered IMS services. For example, a VoLTE application server (AS) 239 may enable implementation of VoLTE media sessions.

In one implementation, HSS 231 and the CSCF components may be configured to allow a user that has an account with telecommunication provider that operates cellular network 220, to register multiple devices (e.g., for purposes of VoLTE media sessions) with a single account associated with cellular network 220. The account may be identified by, for example, the MDN associated with the account and/or with a primary device (i.e., one of UEs 205). Additionally, consistent with aspects described herein, a single device may simultaneously be associated with multiple MDNs. The mobile device may act as an endpoint for any media session that is initiated or terminated with any of the multiple MDNs.

In one implementation, for example, S-CSCF 232, HSS 231, and/or VoLTE AS 239 may keep track of all the devices that are associated with a particular MDN. For example, each device (e.g., user device 210 or UE 205) may be associated with a device identifier that uniquely identifies the hardware device. For instance, a device International Mobile Station Equipment Identity (IMEI) or Media Access Control (MAC) identifier may be used to uniquely identify each device. For each device associated with a particular MDN, S-CSCF 232, HSS 231, and/or VoLTE AS 239 may store an indication of the unique identifier and may potentially also store the address, such as the IP address, of the device. When making SIP signaling forwarding decisions, S-CSCF 232, HSS 231, and/or VoLTE AS 239 may forward the SIP signaling packets to all the devices associated with the particular MDN. In this manner, VoLTE communications with an MDN (or another account/device identifier) may result in simultaneous notifications at each of the registered devices. Users may, at will, register or deregister particular devices with an MDN.

IMS core network 230 may further include Multimedia Resource Function (MRF) 238. MRF 238 may include one or more computing devices that provide services related to media manipulation, (e.g., voice stream mixing, media codec processing) and the playing of tones and announcements. The functions of MRF 238 may be divided into a media resource function controller (MRFC) function and a media resource function processor (MRFP) function. The MRFC function may be implemented as a signaling plane node that interprets information coming from application servers and S-CSCF 232 to control the MRFP. The MRFP may be implemented as a media plane node used to mix, generate, or otherwise process streams.

Additionally, as shown in FIG. 2, a Session Border Control (SBC) device 237 may act as an access element, for user devices 210, for external network traffic (e.g., "Internet" traffic). SBC device 237 may, for example, act as a gateway device for external traffic.

External network 240 may include a IP-based packet data network or another type of network. For example, external network 240 may represent a public network (e.g., the Internet), a private packet data network, or a combination of a number of public and/or private networks. Access to external network 240, by user devices 210, may be provided through wireless or wired links. For example, a particular user device 210 may be associated with a household that obtains access to external network 240 from an ISP. User devices 210 may be provided with application software, such as VoLTE clients, that access IMS core network, such as via P-CSCF 236, to enable IMS multimedia services (e.g., voice services, video services, and/or other media services).

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via other networks or links.

Figure 3:
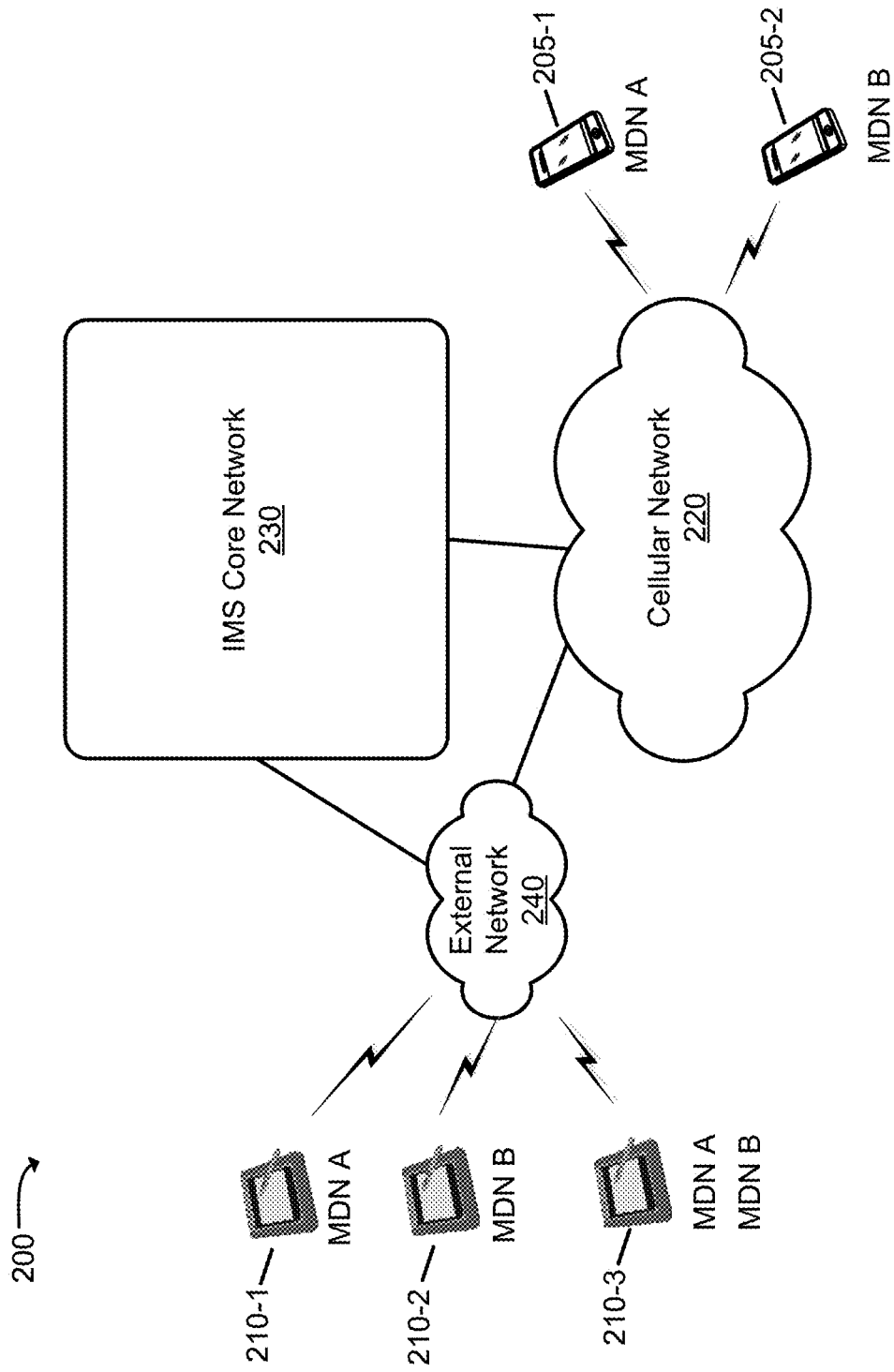

FIG. 3 is a diagram illustrating another example view of environment 200, in which MDNs are illustrated as being associated with secondary devices. In FIG. 3, two UEs, labeled as UE 205-1 and UE 205-2, are illustrated. UE 205-1 is assigned "MDN A" and UE 205-2 is assigned "MDN B". Three secondary user devices, such as tablet computers, are also illustrated: user device 210-1, user device 210-2, and user device 210-3. User devices 210-1, 210-2, and 210-3 may not normally be associated with MDNs, and may thus not be able to participate, as endpoints, in IMS/VoLTE media sessions directed to MDN A or B. Through a user interface, such as one presented by user devices 210 or UEs 205, users may selectively enable or disable the association of MDNs with user devices 210. For example, as shown in FIG. 3, user device 210-1 has been associated with MDN A, user device 210-2 has been associated with MDN B, and user device 210-3 has been associated with both MDN A and MDN B.

Figure 4:
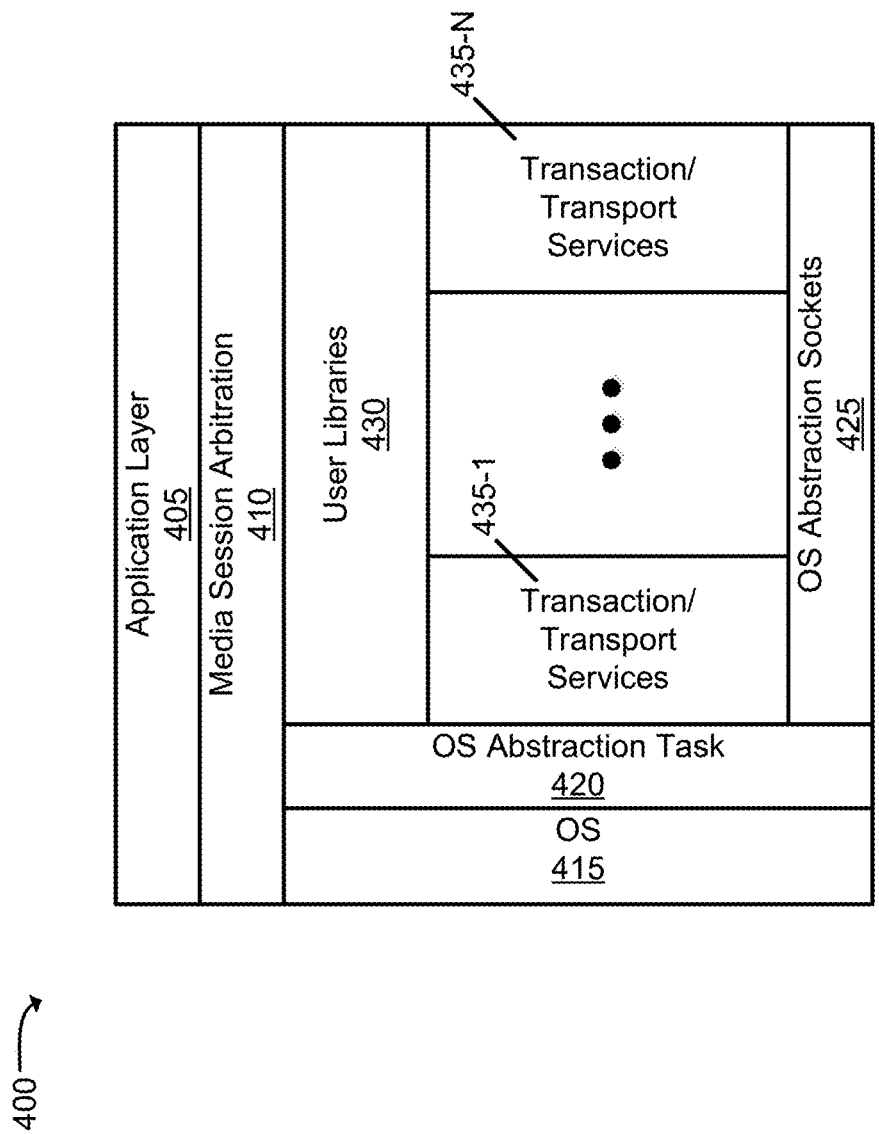
FIG. 4 is a diagram illustrating an example software stack for a user device.

FIG. 4 is a diagram illustrating an example software stack 400 for one of UEs 205 or user devices 210. As shown, software stack 400 may include application layer 405 and media session arbitration layer 410 arbitration. In some implementations, the functions performed by media session arbitration layer 410 may be performed by application layer 405. However, for clarity, application layer 405 and media session arbitration layer 410 will be described separately herein. Software stack 400 may additionally include an operating system (OS) 415, operating system (OS) abstraction task layer 420, and OS abstraction sockets layer 425. Additionally, software stack 400 may include user libraries 430 and transaction transport services 435-1 through 435-N.

Application layer 405 may operate to provide application layer services to users of UEs 205 or user devices 210. The application layer services may include, for example, providing the user interface and end-user application functionality. For example, a video playback application, implemented as an application corresponding to application layer 405, may playback streaming VoLTE video sessions to a user. The application can thus implement the user interface for the video playback application, and receive and process media streams corresponding to the streaming video. Media session arbitration layer 410 may include one or more processes that perform conflict resolution and/or handle inter-operability conditions caused by having user device 210 be associated with multiple MDNs. For example, for VoLTE voice calls, only one voice call at a time may be permitted to be active at the user device. If multiple voice calls are concurrently received, for the different MDNs associated with user device 210, media session arbitration layer 410 may, for example, query the user to determine which of the multiple voice calls is to be made active. As another example of media session conflict resolution, media session arbitration layer 410 may not allow multiple calls to be simultaneously placed, from user device 210, using different MDNs. As another example of the operation of media session arbitration layer 410, arbitration layer 410 may arbitrate between incoming and outgoing media sessions that are being made using different MDNs.

OS 415 may represent an OS designed to serve real-time application processes. In one implementation, OS 415 may include a real-time OS (RTOS) OS abstraction task layer 420 and OS abstraction sockets layer 425 may implement abstraction layers for OS 415. Other layers of software stack 400 may call functions, relating to the OS, by indirectly calling OS abstraction task layer 420 and OS abstraction sockets layer 425. OS abstraction task layer 420 and OS abstraction sockets layer 425 may provide standardization of the functions provided by OS 415 and standardization relating to hardware features of different UEs 205 and/or user devices 210. User libraries 430 may represent libraries and/or services that are callable by transaction/transport services 435 or by other software layers. User libraries 430 may include, for example, libraries relating to Third Generation Partnership Project (3GPP) user agent processes, 3GPP authentication layer processes, 3GPP SIP signaling libraries, or other software libraries.

Transaction/transport services 435-1 to 435-N may each represent an instance of a SIP signaling process that is used to implement SIP control plane signaling for IMS services (e.g., VoLTE services). For each MDN, a new instance of transaction/transport services 435 may be instantiated. Each instance of transaction/transport services 435 may operate to store state information relating to the communication state of the media sessions associated with the MDN and control the communication, via SIP signaling, with IMS core network 230.

Figure 5:
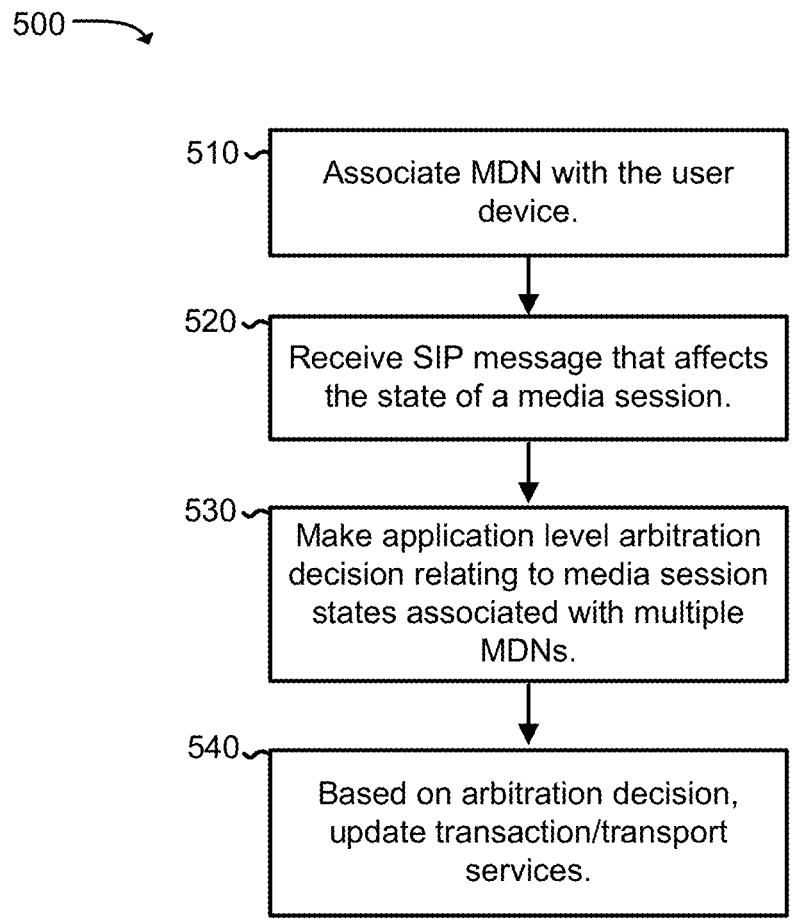
FIG. 5 is a flowchart illustrating an example process for handling media sessions at a user device that is associated with multiple Mobile Device Numbers (MDNs)

FIG. 5 is a flowchart illustrating an example process 500 for handling media sessions at a user device that is associated with multiple MDNs. Some or all of process 500 may be performed by a UE 205 or a user device 210.

Process 500 may include associating an MDN with the user device (block 510). As previously mentioned, users may indicate, to IMS core network 230, that the user would like to associate an MDN with a user device 210. For example, user device 210 may include an application that allows users to select to "turn-on" or "turn-off" MDNs, associated with the user, for the user device. In this example, assume that the user has an account with a cellular network provider, and the user's account includes three primary UEs, all of which are assigned MDNs (e.g., the user may have three smartphones in the user's household). The user may have previously authenticated user device 210 as being authorized to be associated with any of the MDNs of the user's account. The available MDNs may then be displayed, at user device 210, or at other devices (e.g., UEs 205), as MDNs that can be assigned to user device 210 (i.e., to a non-primary device). When the user selects an MDN to assign, the request may be registered with IMS core network 230. For example, one or more of HSS 231, S-CSCF 232, or P-CSCF 236 may store a data structure that maintains the current association between an MDN and each of the non-primary and primary devices that are currently associated with the MDN. Consistent with aspects described herein, UE 205 or user device 210 may be simultaneously associated with multiple MDNs.

In some implementations, when UE 205/user device 210 is newly associated with an MDN, IMS core network 230 (e.g., S-CSCF 232), after validating and/or authenticating the association, may initially communicate with the corresponding devices to inform and/or register the MDNs with the devices. For example, in response to a tablet device being associated with a particular MDN, the tablet device may receive an "association" message from IMS core network 230. In response, the tablet device may instantiate an instance of transaction/transport service 435. The new instance of transaction/transport service 435 may be associated with and/or identified based on the MDN.

Process 500 may further include receiving a SIP message that affects the state of a media session (block 520). The SIP message may be received at user device 210 and be, for example, a SIP message indicating a state change associated with a media session (e.g., established, terminated, put on hold, and/or requested (e.g., a "ring" indication)). In general, the SIP message may relate to any change of state of the media session in which one of the MDNs is involved in the media session.

Process 500 may further include, in response to the received SIP message, making an application level arbitration decision relating to media session states associated with multiple MDNs (block 530). The arbitration decision may be performed by, for example, media session arbitration layer 410. The arbitration decision may resolve conflicts in the simultaneous use of the multiple MDNs. The arbitration decision may be made based on one or more arbitration rules. For example, one arbitration rule may be that multiple voice/video calls cannot be active at the same time. This arbitration rule may indicate the actions that are to be performed when a new call request is received while the current call is ongoing.

In some situations, different media sessions, associated with different MDNs, may be established by different core networks 230 (e.g., by different telecommunication carriers). Alternatively or additionally, in the situation of a single telecommunications carrier, different network elements, such as different network devices in IMS core network 230, may independently establish media sessions (e.g., without coordination of the different media sessions). Accordingly, the arbitration decisions described herein may desirably be performed at the client device (e.g., at UE 205 or a user device 210).

Based on the arbitration decision, the affected transaction/transport services may be updated (block 540). In one implementation, media session arbitration layer 410 may update the state of the instances of transaction/transport services 435 to indicate the current state of the media sessions managed by each of the transaction/transport services 435. For example, media session arbitration layer 410 may forward the received SIP signaling message to the affected transaction/transport services 435. As another example, media session arbitration layer 410 may generate additional SIP messages (or other messages) to update the state of transaction/transport services 435 (e.g., if a call invite SIP message for MDN A is determined to cause a current call to MDN B to be put on hold, transaction/transport services 435 may be instructed to initiate putting the call to MDN B on hold). In some implementations, and as mentioned below, routing of the arbitration decisions to the affected transaction/transport services may be performed based on the MDNs. That is, each transaction/transport service instance 435 may be identified (and communicated with), by media session arbitration layer 410, based on the corresponding MDN. In alternative implementations, other identification values, such as a SIP identifier or another identifier, may be used to route communications to the appropriate transaction/transport service instance 435.

Figure 6:
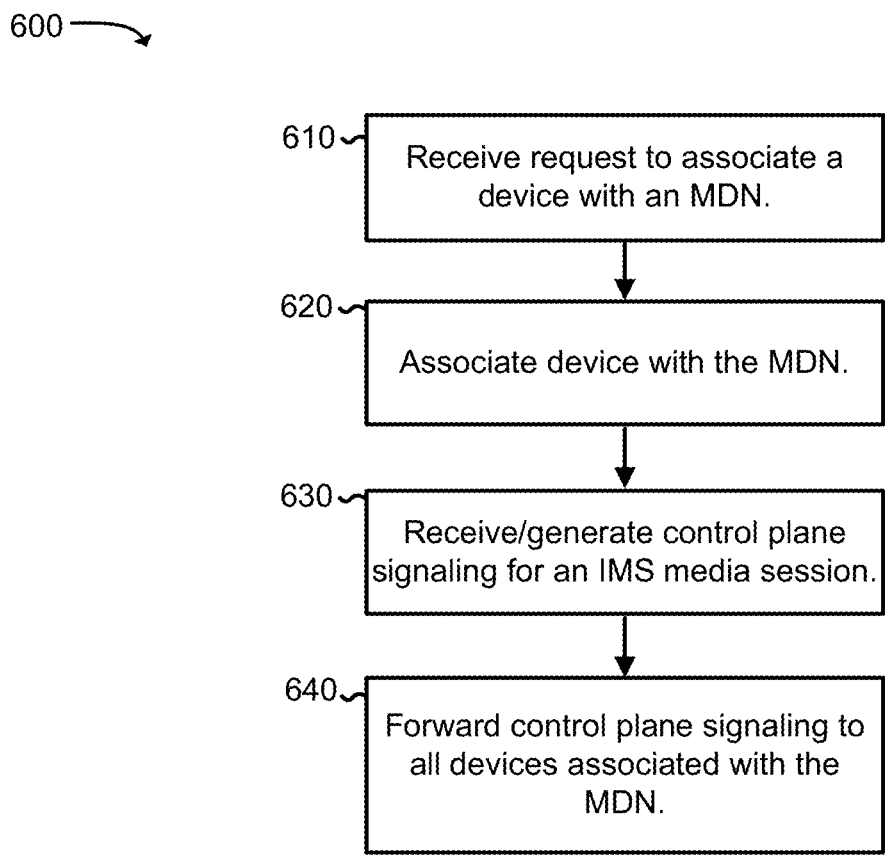
FIG. 6 is a flowchart illustrating an example process for coordinating the association of multiple MDNs with a user device.

FIG. 6 is a flowchart illustrating an example process 600 for coordinating the association of multiple MDNs with a user device. Some or all of process 600 may be performed by one or more devices in IMS core network 230, such as S-CSCF 232, HSS 231, and/or P-CSCF 236.

Process 600 may include receiving a request to associate a device with an MDN (block 610). As previously mentioned, users, of UEs 205 or user devices 210, may choose to associate MDNs with secondary user devices, such that the initiation of media sessions directed to a particular MDN will be received at each of the devices associated with the MDN. A request, to associate a particular user device 210, with a particular MDN, may be received at S-CSCF 232 or P-CSCF 236.

Based on the request, the user device may be associated with the MDN (block 620). For example, as shown in FIG. 3, user device 210-1 may be associated with MDN A and user device 210-3 may be associated with both MDN A and B. In IMS core network 230, for each MDN, a data structure may be maintained that lists the devices associated with the MDN, such as by including a unique device identifier (e.g., IMEI or MAC identifier) and addresses (e.g., IP address and port number) for each device associated with the MDN. For a particular device associated with multiple MDNs, the device identifier and address may be the same for each MDN. As described with respect to FIG. 5, in this situation, arbitration between the multiple MDNs, associated with the device, may be performed at the device and based on the MDN.

Process 600 may further include receiving and/or generating control plane signaling for an IMS media session (block 630). The IMS media session may relate to a media session, such as a VoLTE voice call, video call, streaming audio or video, etc. The control plane signaling may include SIP messages, such as SIP messages indicating that a particular IMS service is being requested, terminated, and/or otherwise modified. The SIP messages may indicate the MDN to which the service is directed.

Process 600 may further include forwarding the control plane message to all the devices associated with the MDN (block 640). In this manner, control plane messages for the IMS media session may be received at multiple devices.

Figure 7:
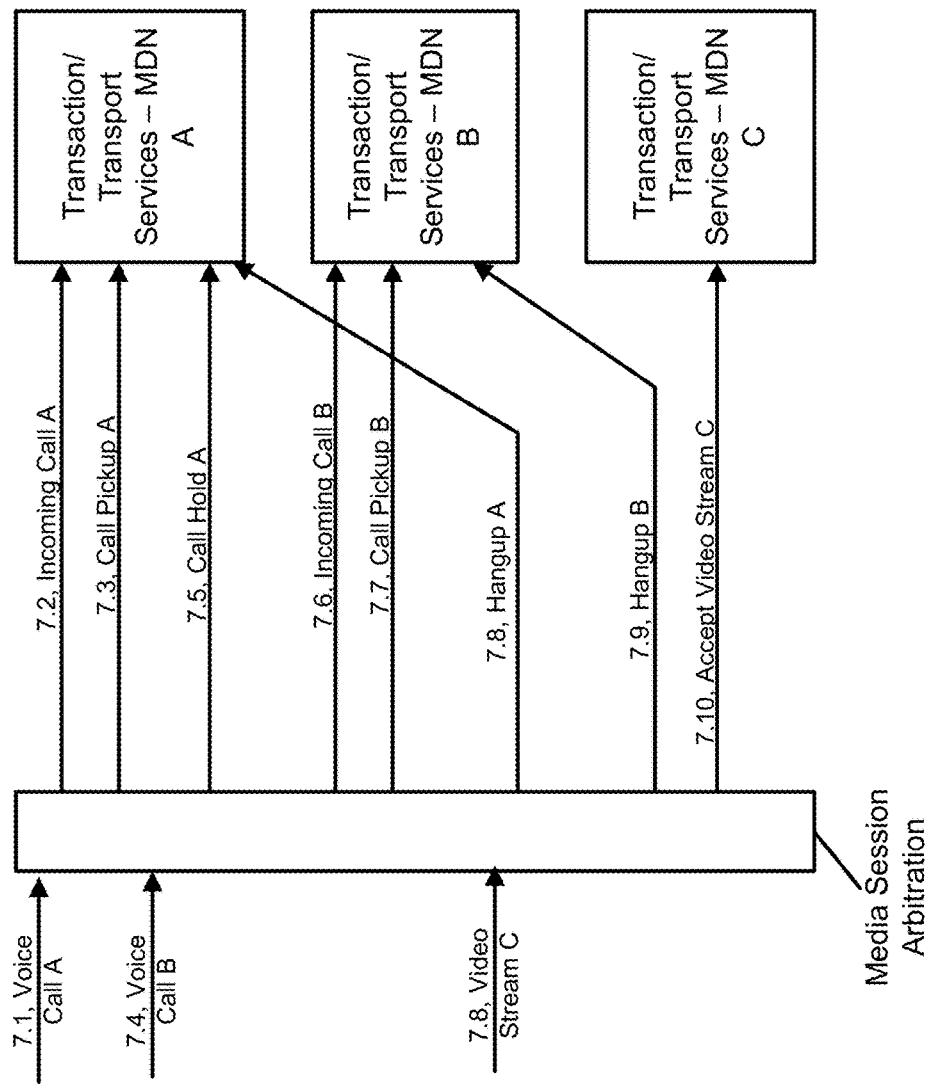
FIG. 7 is a signal diagram illustrating one example of arbitration decisions made for a user device that is associated with multiple MDNs.

FIG. 7 is a signal diagram illustrating one example of arbitration decisions made for a user device that is associated with multiple MDNs. As shown, assume that three transaction/transport service instances are being executed at the user device. The three service instances are associated with "MDN A," "MDN B," and "MDN C." A media session arbitration layer may provide arbitration for potential conflicts relating to the use of media sessions with the three MDNs.

Initially, a control plane message to initiate a voice call, for MDN A, may be received (at 7.1, "voice call A"). In response, the transaction/transport services associated with MDN A may be updated to reflect the incoming call (at 7.2, "Incoming Call A"). For example, the media session arbitration layer may update a state machine implemented by the transaction/transport services associated with MDN A. Via an application layer process, a user may indicate that the user would like to pick up the call (e.g., via a graphical interface). The transaction/transport services associated with MDN B may be updated to indicate that the "call pickup" event occurred (at 7.3, "Call Pickup A").

Assume that a SIP request to initiate a second voice call, with MDN B, is received (at 7.4, "Voice Call B"). The arbitration rules associated with the media session arbitration layer may indicate that two simultaneous voice calls are not permitted, and accordingly, a decision may be made as to how to handle the two voice calls. For example, an application layer process may be used to obtain, via a graphical interface, user input relating to how the user would like to handle the two calls. In this example, assume that the user chooses to put the call associated with MDN A on hold and pick up the call with MDN B. Accordingly, the transaction/transport services associated with MDN A may be updated to indicate that the "hold" event occurred (at 7.5, "Call Hold A"). Additionally, the transaction/transport services associated with MDN B may be updated to reflect the incoming call (at 7.6, "Incoming Call B") and to reflect the "call pickup" event (at 7.7, "Call Pickup B").

As another example, the arbitration rules may indicate that multiple two simultaneous voice calls are permitted, but only if the two voice calls can be joined as a single conference call. Accordingly, in this situation, if a conference call is possible, the application layer process may also provide an option to initiate a conference call based on the two calls.

Assume that a SIP request to initiate a video steam, with MDN C, is next received (at 7.8, "Video Stream C"). Further, assume that the arbitration logic is configured to not allow voice calls to be simultaneously active while a video stream is being received. The application layer process may obtain, via a graphical interface, user input relating to how the user would like to handle the conflicting media sessions. In this example, assume that the user indicates that the user would like to receive the video stream and thus end the voice calls. Accordingly, the transaction/transport services associated with MDN A may be updated to indicate that the "hangup" event has occurred (at 7.8, "Hangup A"); the transaction/transport services associated with MDN B may be updated to indicate that the "hangup" event has occurred (at 7.9, "Hangup B"); and the transaction/transport services associated with MDN C may be updated to indicate that the video stream should be accepted (at 7.10, "Accept Video Stream C").

Figure 8:
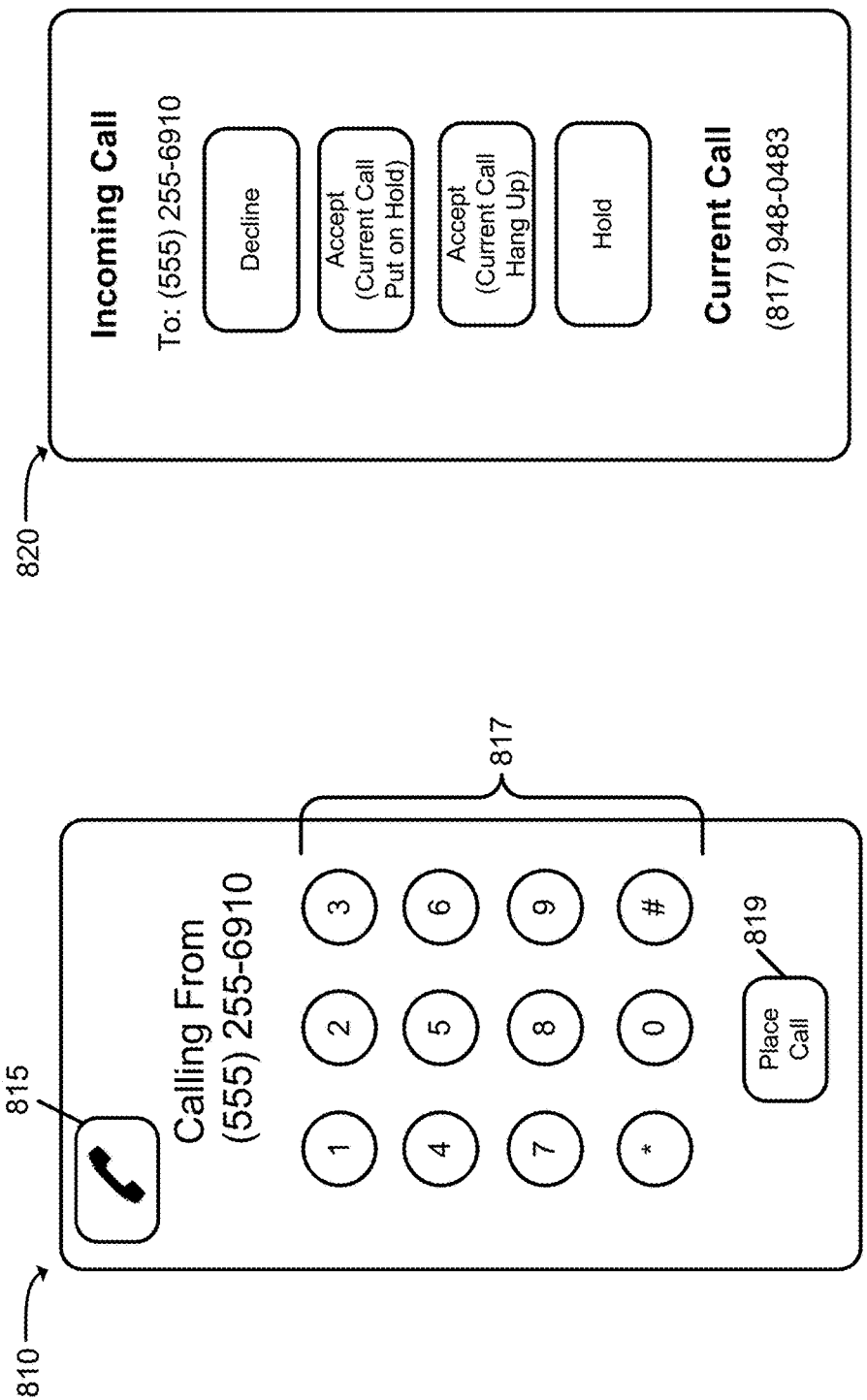
FIGS. 8A and 8B are diagrams illustrating a graphical user interface that may be provided to a user to assist in selecting media sessions.

FIGS. 8A and 8B are diagrams illustrating example user interfaces that may be provided when receiving or placing a call using a device associated with multiple MDNs.

In FIG. 8A, an example user interface 810 is illustrated for an outgoing call. As shown, user interface 810 may include an indication of the number that is currently being used to place the call ("Calling From (555) 255-6910"). Graphical icon 815, when selected, may change the number that is currently being used to place the call. For example, selecting graphical icon 815 may cause the other or next MDN, associated with the device, to be selected as the active number for the outgoing call. The user may input a number to call through graphical keypad 817 and initiate placing of a call using "place call" button 819.

FIG. 8B illustrates an example user interface 820 for an incoming call. In this example, assume that an incoming call (to number (555) 255-6910) is received while the user is currently on a another call (e.g., associated with number (817) 948-0483). User interface 802 may provide a number of options relating to how the user would like to handle the call. For example, the user may decline the incoming call and thus continue with the ongoing call ("Decline"). Alternatively, the user may accept the incoming call and put the ongoing caller on hold ("Accept (Current Call Put on Hold)"). Alternatively, the user may accept the incoming call and hang up the ongoing call ("Accept (Current Call Hang Up)"). Alternatively, the user may put the incoming call on hold ("Hold"). As another example, if a conference call is possible with the two MDNs, another option may be provided to initiate the conference call.

Figure 9:
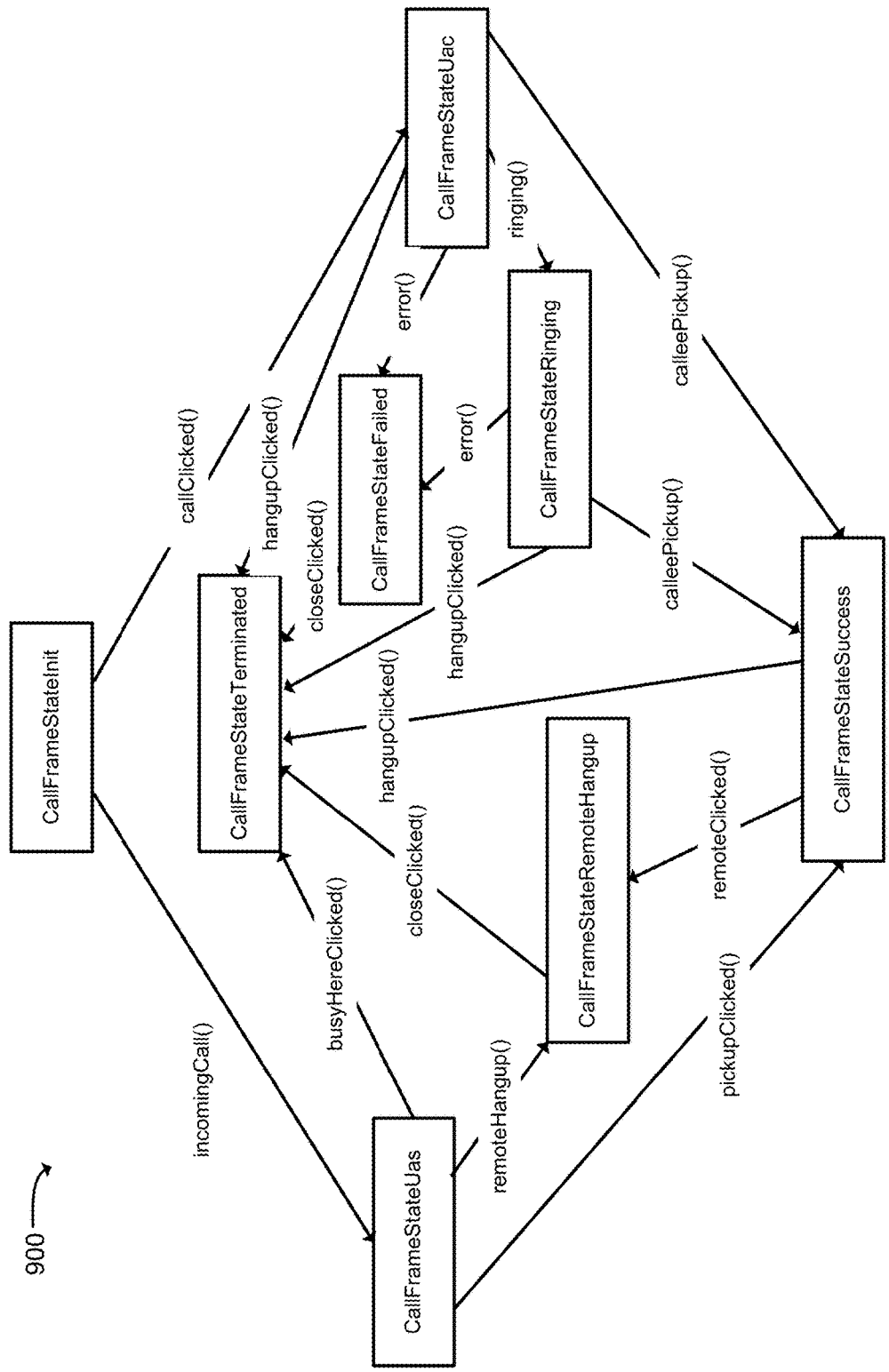
FIG. 9 is a diagram illustrating an example of a state machine that may be implemented for the by transaction/transport services illustrated in FIG. 4.

FIG. 9 is a diagram illustrating an example of a state machine 900, for the completion of a VoLTE call, that may be implemented by each of transaction/transport services 435. In FIG. 9, rectangles indicate states and the lines between the rectangles indicate state transitions and the events that correspond to the state transitions. As described previously, the events may be issued by application layer processes, such as by media session arbitration layer 410, and or received from IMS core network 230.

As mentioned, when UE 205 or user device 210 is associated with multiple MDNs, a corresponding number of transaction/transport service instances 435 may be simultaneously instantiated. Each of the transaction/transport service instances 435 may separately maintain a copy of state machine 900. State machine 900 is an example of a state machine for a VoLTE call. Each transaction/transport service instance 435 may also maintain other state machines corresponding to other types of media sessions (e.g., video calls, one way streaming media, etc.). Media session arbitration layer 410 and/or state machines 900 may be configured so that state transitions in the state machine can be triggered by calls from media session arbitration layer 410. For example, media session arbitration layer 410 may be capable of programmatically triggering a "closeClicked( )" event to state machine 900.

As shown in FIG. 9, the possible states for state machine 900 may include: "CallFrameStateInit" (the initial state), "CallFrameStateUas" (user-agent server state, which may be a state normally reached based on server control signaling); "CallFrameStateUac" (user-agent client, which may be a state reached based on client control signaling, such as application layer process signaling); "CallFrameStateTerminated" (call terminated state); "CallFrameStateFailed" (call failed state); "CallFrameStateRemoteHangup" (remote hang up state); "CallFrameStateRinging" (ringing state); "CallFrameStateSuccess" (call completed successfully state). Transitions between the states illustrated in FIG. 8 may occur in response to the indicated events. For example, state machine 800 may transition from the "CallFrameStateInit" state to the "CallFrameStateUas" state when an incoming call event occurs, such as a call initiated by another number. State machine 800 may transition from the "CallFrameStateInit" state to the "CallFrameStateUac" state when a user indicates that a call should be placed ("call click" event).

When in the "CallFrameStateUas" state, an indication that the user device is busy "busyHereClicked" event may cause state machine 900 to transition to the "CallFrameStateTerminated" state; a remote hang-up ("remoteHangup") event may cause state machine 800 to transition to the "CallFrameStateRemoteHangup" state; and a user pickup of the call ("pickupClicked") event may cause state machine 900 to transition to the "CallFrameStateSuccess" state. Similarly, when in the "CallFrameStateUac" state, an indication of an error event ("error") may cause state machine 900 to transition to the "CallFrameStateFailed" state; an indication that a hang-up was performed at the user device ("hangupClicked") may cause state machine 800 to transition to the "CallFrameStateTerminated" state; and an indication that the user device is performing a ringing operation ("ringing") may cause state machine 900 to transition to the "CallFrameStateRinging" state; and a user pickup of the call ("calleePickup") event may cause state machine 800 to transition to the "CallFrameStateSuccess" state.

When in the "CallFrameStateRemoteHangup" state or the "CallFrameStateFailed" state, a user initiated close ("closeClicked") event may cause state machine 900 to transition to the "CallFrameStateTerminated" state. When in the "CallFrameStateRinging" state, an error event, hangup event, and callee pickup event may result in state machine 900 transitioning to the "CallFrameStateFailed" state, the "CallFrameStateTerminated" state, and the "CallFrameStateSuccess" state, respectively.

Figure 10:
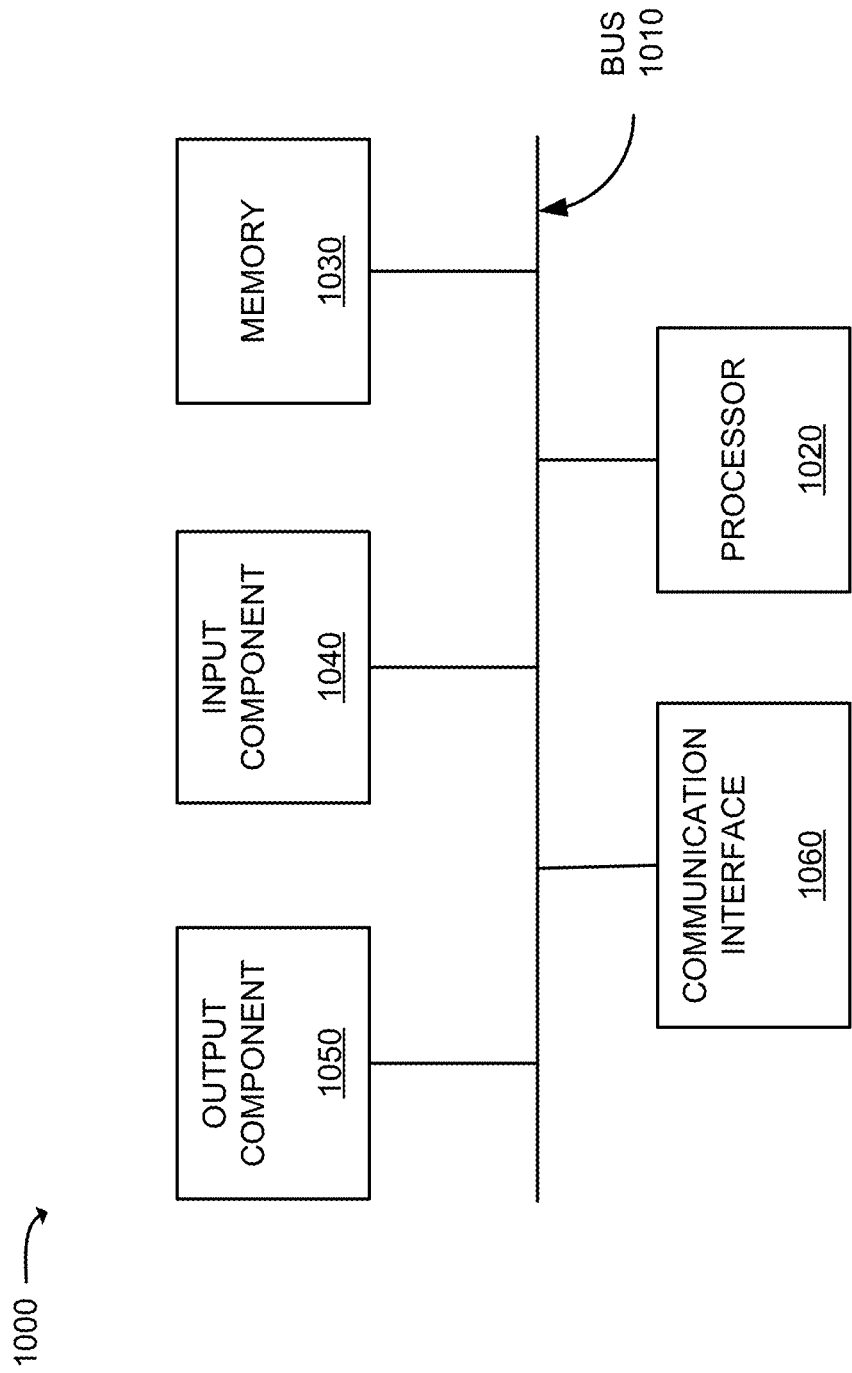
FIG. 10 is a diagram of example components of a device.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface, a radio interface, and an Ethernet interface.

Device 1000 may include logic to perform certain operations relating to one or more processes described above. For example, device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks have been described with regard to FIGS. 5 and 6, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device comprising:
 a non-transitory computer-readable medium containing program instructions; and
 one or more processors to execute the program instructions to:
  associate the user device with a plurality of Mobile Device Numbers (MDNs), each of the plurality of the MDNs being assigned to User Equipment (UE) that is associated with a wireless cellular network;
  execute, by the user device and for each of the plurality of MDNs, a Session Initiation Protocol (SIP) transaction/transport service instance, each of the SIP transaction/transport service instances implementing control plane signaling for Internet Protocol (IP) Multimedia Subsystem (IMS) services and maintaining state information describing a communication state of media sessions implemented via the IMS services, and each of the media sessions being associated with one of the plurality of the MDNs;
  receive a SIP signaling message relating to a particular one of the media sessions; and
  update, based on the received SIP signaling message, the state information for each of the SIP transaction/transport service instances that are affected by the received SIP signaling message, the updating of the state information including arbitrating conflicts, caused by simultaneous use of multiple MDNs for IMS services, wherein the updating of the state information is based on a result of the arbitration.

2. The user device of claim 1, wherein the association of the user device with the plurality of MDNs is selectively performed based on user input.

3. The user device of claim 1, wherein updating the state information of the SIP transaction/transport service instance further includes providing an indication of a state transition event to a state machine associated with the SIP transaction/transport service instance.

4. The user device of claim 1, wherein each of the SIP transaction/transport service instances are executed independently of one another.

5. The user device of claim 1, wherein the particular one of the media sessions is a media session corresponding to a voice call, and wherein, when arbitrating conflicts, the one or more processors are further to execute the program instructions to:
   determine whether a second media session corresponds to a voice call;
   obtain user input, in response to the determination that the second media session corresponds to a voice call, selecting whether the particular one of the media sessions or the second media session is to be made the active media session; and
   update the state information for the SIP transaction/transport service instance to place the non-selected media session in an on-hold or terminated state.

6. The user device of claim 1, wherein the received SIP signaling messages are SIP signaling messages that are received from an IMS core network.

7. The user device of claim 1, wherein the one or more processors are further to execute the program instructions to:
   obtain, for an outgoing media session, user input indicating which of the plurality of MDNs are to be used for the outgoing media session.

8. A method, implemented by a user device, comprising:
   associating the user device with a plurality of Mobile Device Numbers (MDNs), each of the plurality of the MDNs being assigned to User Equipment (UE) that is associated with a wireless cellular network;
   executing, by the user device and for each of the plurality of MDNs, a Session Initiation Protocol (SIP) transaction/transport service instance, each of the SIP transaction/transport service instances implementing control plane signaling for Internet Protocol (IP) Multimedia Subsystem (IMS) services and maintaining state information describing a communication state of media sessions implemented via the IMS services, and each of the media sessions being associated with one of the plurality of the MDNs;
   receiving a SIP signaling message relating to a particular one of the media sessions; and
   updating, based on the received SIP signaling message, the state information for each of the SIP transaction/transport service instances that are affected by the received SIP signaling message, the updating of the state information including arbitrating conflicts, caused by simultaneous use of multiple MDNs for IMS services, wherein the updating of the state information is based on a result of the arbitration.

9. The method of claim 8, wherein the association of the user device with the plurality of MDNs is selectively performed based on user input.

10. The method of claim 8, wherein updating the state information of a SIP transaction/transport service instance includes providing an indication of a state transition event to a state machine associated with the SIP transaction/transport service instance.

11. The method of claim 8, wherein each of the SIP transaction/transport service instances are executed independently of one another.

12. The method of claim 8, wherein the particular one of the media sessions is a media session corresponding to a voice call, and wherein, when arbitrating conflicts, the method further includes:
   determining whether a second media session corresponds to a voice call;
   obtaining user input, in response to the determination that the second media session corresponds to a voice call, selecting whether the particular one of the media sessions or the second media session is to be made the active media session; and
   updating the state information for the SIP transaction/transport service instance to place the non-selected media session in an on-hold or terminated state.

13. The method of claim 8, wherein the received SIP signaling messages are SIP signaling messages that are received from an IMS core network.

14. A non-transitory computer readable medium containing program instructions for causing one or more processors to:
   associate the user device with a plurality of Mobile Device Numbers (MDNs), each of the plurality of the MDNs being assigned to User Equipment (UE) that is associated with a wireless cellular network;
   execute, by the user device and for each of the plurality of MDNs, a Session Initiation Protocol (SIP) transaction/transport service instance, each of the SIP transaction/transport service instances implementing control plane signaling for Internet Protocol (IP) Multimedia Subsystem (IMS) services and maintaining state information describing a communication state of media sessions implemented via the IMS services, and each of the media sessions being associated with one of the plurality of the MDNs;
   receive a SIP signaling message relating to a particular one of the media sessions; and
   update, based on the received SIP signaling message, the state information for each of the SIP transaction/transport service instances that are affected by the received SIP signaling message, the updating of the state information including arbitrating conflicts, caused by simultaneous use of multiple MDNs for IMS services, wherein the updating of the state information is based on a result of the arbitration.

15. The non-transitory computer readable medium of claim 14, wherein the association of the user device with the plurality of MDNs is selectively performed based on user input.

16. The non-transitory computer readable medium of claim 14, wherein updating the state information of a SIP transaction/transport service instance further includes providing an indication of a state transition event to a state machine associated with the SIP transaction/transport service instance.

17. The non-transitory computer readable medium of claim 14, wherein each of the SIP transaction/transport service instances are executed independently of one another.

18. The non-transitory computer readable medium of claim 14, wherein the particular one of the media sessions is a media session corresponding to a voice call, and wherein, when arbitrating conflicts, the one or more processors are further to execute the program instructions to:
- determine whether a second media session corresponds to a voice call;
- obtain user input, in response to the determination that the second media session corresponds to a voice call, selecting whether the particular one of the media sessions or the second media session is to be made the active media session; and
- update the state information for the SIP transaction/transport service instance to place the non-selected media session in an on-hold or terminated state.

19. The non-transitory computer readable medium of claim 14, wherein the received SIP signaling messages are SIP signaling messages that are received from an IMS core network.

20. The non-transitory computer readable medium of claim 14, wherein the instructions further cause the one or more processors to:
- obtain, for an outgoing media session, user input indicating which of the plurality of MDNs are to be used for the outgoing media session.

* * * * *